Figure 1:
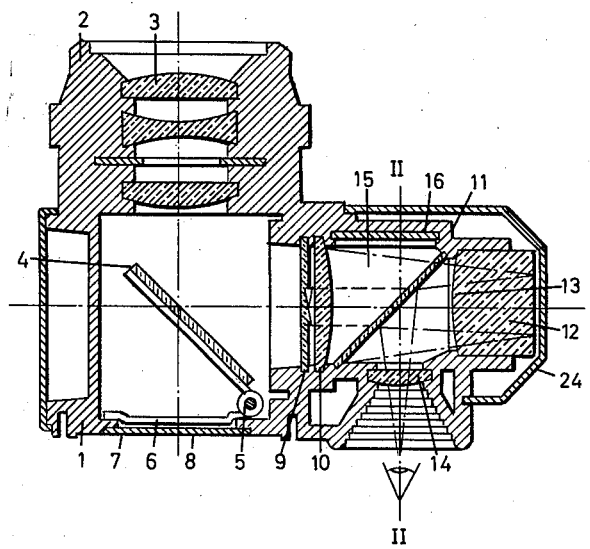

Sept. 10, 1963      K. H. LANGE      3,103,150
MIRROR REFLEX CAMERAS
Filed Sept. 11, 1961      2 Sheets-Sheet 1

INVENTOR:
Karl Heinz Lange

By Maxwell E. Sparrow
Attorney

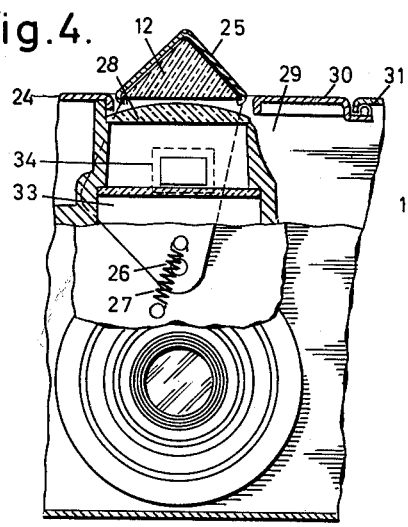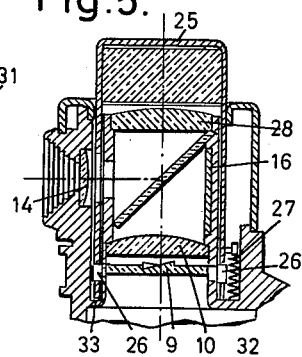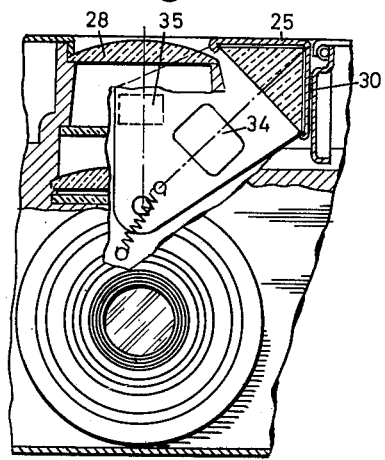

United States Patent Office 3,103,150
Patented Sept. 10, 1963

3,103,150
MIRROR REFLEX CAMERAS
Karl Heinz Lange, Bunde-Ennigloh, Germany, assignor to Balda-Kamerawerk Rudolf Grüter, Kommanditgesellschaft, Westphalia, Germany, a German company
Filed Sept. 11, 1961, Ser. No. 137,211
Claims priority, application Germany Sept. 17, 1960
8 Claims. (Cl. 95—10)

Photographic cameras which have a mirror adjustable through an angle of about 45° inset between the lens and the image path for the purpose of reflection of a view finder image have been known for a long time.

The view finder image projected on to a ground glass panel at the upper side of the camera corresponding to the taking lens is of course upright, but is laterally reversed. For more favourable operation the view finder image can by means of a roof-edge prism and a further mirror be presented to the operator in an upright position and laterally correct in the direction of the optical axis. The roof-edge prism referred to and the further mirror surface are generally combined to a so called pentaprism. This prism because of the necessary inclined positioning both of the roof edge prism and the further mirror occupies a considerable space and furthermore its manufacture is difficult and costly. If the pentaprism is arranged in an exchangeable manner the view finder device either projects high above the camera hood or on the removal of the prism there is left a deep cavity in the camera hood which is very difficult to clean and is unsightly in appearance.

For these known devices it has already been proposed to provide the roof-edge surface of the prism with light cells in order in this way to measure photoelectrically through the taking lens the intensity of illumination of the subject. This as yet only theoretically known arrangement presumes however, a difficult light intensity reducing technique of the pentaprism and accordingly further increases the cost of the prism.

It is an object of the present invention to provide a mirror reflex camera with an image reversing device wherein some of the above-mentioned disadvantages are avoided.

According to the invention a reflex camera fitted with a roof-edge prism for image observation is so constructed that the mirror for providing an upright view-finder image is constructed so as to be preferably approximately 50% partially permeable and is located between the roof-edge prism and the view-finder image receiving surface and so that the portion of light reflected from the partially permeable mirror for measurement of the intensity of illumination of the view finder image falls on a light cell which is fixed opposite to the view finder sight in the inner wall of the view finder focussing hood. Thus the reversing mirror arranged as an addition to the roof-edge prism is not constructed as part of a pentaprism but is in the form of a partly permeable mirror in the path of rays between the ground glass panel and the simple roof-edge prism secured over it. This gives rise to the advantages mentioned below.

The space in the camera hood normally provided in the front of a mirror reflex camera of this type for the pentaprism is omitted. Instead at that position a place is created for the introduction of a light-cell. The small roof-edge prism located above the partly permeable mirror, preferably parallel to the ground glass panel, can be spherically curved at the hypotenuse surface thereof turned towards the ground glass panel, especially in the case of a fixed built-in prism whereby an effective viewing magnifying glass is provided for the image on the ground glass panel. If the camera is constructed so as to be changeable from the focussing hood embodiment to an embodiment with a reversing prism then preferably a fixed field lens is arranged between the semi-permeable mirror and the hypotenuse surface of the roof-edge prism. Depending on the smallness of the roof-edge prism this can be displaceably arranged on a carriage on the upper side of the camera or pivotably in the hood on the camera. The last mentioned arrangement is particularly advantageous in that the prism is secured in the camera against loss.

Figure 3:
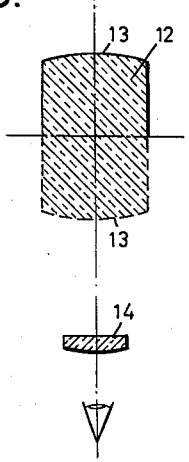
Figure 2:
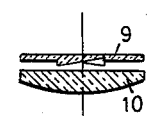

Different embodiments of the invention are described by way of example with reference to the accompanying drawings wherein:

FIGURE 1 is a middle section along the optical axis of the camera,

FIGURE 2 is a section through the horizontal axis of the view finder sight along the line II—II of FIG. 1, FIGURE 3 shows the optically effective means of FIGURE 1 for observation of the view finder image indicated in the drawing along a schematically extended axis, FIGURE 4 is a partial section of the front view of the camera in a further embodiment of the invention, FIGURE 5 is a side sectional view of FIGURE 4 and, FIGURE 6 is another operating position of the illustration of FIGURE 4.

In FIGURES 1, 4, 5 and 6, the shutter 2 is secured on the camera housing 1. The lens 3 projects through the mirror 4 a true image onto the ground glass panel 9.

If the mirror 4 is swung upwards about axis 5 and the light safety flap 6 is also swung out from the image window 7 then the image projected from the lens 3 reaches the film 8. The real image of the ground glass panel 9 is enlarged through a field lens 10, a semi-permeable mirror 11, the roof-edge prism 12, the hypotenuse surface 13 of which is sphero-convex, and through the ocular lens 14 and offered in an upright laterally correct position to the eye of the observer. The roof-edge prism 12 has a triangular cross-section as may be seen in FIG. 6, the hypotenuse surface 13 thereof being arranged facing the semi-permeable mirror 11.

On the side of the view finder chamber 15 lying opposite to the ocular lens 14 is a light cell 16 which is in electrical connection with the light meter 17 illustrated in FIGURE 2. In addition to the light cell 16 there is arranged, as shown in FIGURE 2 a mirror 18, in front of the opening 19, which reflects through a compensating lens 20 on to one or more light meter indicators 21 or other marking devices in the chamber 15.

The lighting of the indicator 21 is effected by a further mirror 22 as well as by the opening 23 in the camera hood 24.

A further embodiment of the invention is illustrated in FIGURE 4 wherein the prism 12 is fitted in a holder 25 pivotable about axis 26. An over-centre spring 27 is provided to retain the prism 12 and the prism holder 25 in one of the two end positions.

In place of the sphero-convex hypotenuse surface 13 of the prism 12 used in the embodiment illustrated in FIGURE 1 an observation magnifying glass 28 is provided in the embodiment shown in FIGURES 4–6. In the hood 24 the opening 29, into which the prism 12 can be swung by means of the prism holder 25, is covered over by the flap 30 when the prism stands above the lens 28, which flap is mounted for rotation about axis 31. The prism holder 25 terminates in lugs 32 and 33 which form at their lower ends the bearing positions for axis 26. In the lug 33 is an aperture 34 which is somewhat larger than the view-finder sight opening 35.

The method of operation of the arrangement according to FIGURE 1 is as follows:

By means of the lens 3 an image projected from the mirror 4 onto the ground glass panel 9 corresponds in detail exactly with the image which after pivoting of the mirror 4 and the flap 6 reaches the film 8.

The rays of the image leaving the ground glass panel 9 first penetrate the field lens 10 and then impinge on the partially permeable mirror 11. A portion of the light limited by the reflection properties of the mirror then reaches the light cell 16 whilst the other portion passes through the mirror 11 and penetrates into the roof edge prism 12. Here the laterally reversed view finder image is turned in known manner to the laterally correct position and after leaving the prism and repeated partial reflection in the mirror 11 is projected through the ocular lens 14 into the eye of the observer.

FIGURE 3 shows the prism 12 with its sphero-convex surface 13 of a bi-convex lens which can provide very satisfactorily a magnified image on the ground glass panel 9.

Through the partially permeable mirror 11 there is also visible in or by the view-finder field in addition to the view-finder image because of the mirror 18 the compensating lens 20, the indicator 21 of the light meter 17 according to the position of the opening 19. The portion of light falling on the light-cell 16 corresponds in proportion exactly to the quantity of light later reaching the film 8 and can accordingly be used for measurement, wherein there also comes into consideration the not illustrated but known means for the shutter time as well as the diaphragm position and film sensitivity.

FIGURES 4–6 show a further embodiment possible only in accordance with the present invention, wherein the prism 12 is housed in a prism holder 25, pivotable about the axis 26. The function of the view finder system used with the embodiment shown in FIGURE 4 is similar to that shown in FIGURE 1. If after pressing on the flap 30 the prism holder 25 is pivoted about axis 26 with tensioning of the over-centre spring 27 into the camera hood 24 so that a surface of the prism or its covering forms a plane with the upper edge of the camera then the magnifying glass 28 is freed and the view-finder field can be seen through the transparent mirror by means of the magnifying glass 28, and the field lens 10 from the upper side of the camera. This arrangement is particularly valuable for certain uses for example, as an addition to a microscope. Hitherto with exchangeability of the focussing hood there existed the disadvantage that in changing from one type to the other an accessory not combined with the camera had to be used. In the present case the reversing prism, because of its small dimension, can be swung into the camera hood 24 in the described manner. In the inset position a suitably dimensioned part of the light-impermeable side lug 33 of the prism container 25 covers the opening 35 of the view finder sight and thus protects the light casing from lateral light.

I claim:

1. A mirror reflex camera having an optical view-finder system comprising a view-finder chamber, a roof-edge prism, an image receiving surface, an eye-piece, a mirror correcting the upright view-finder image, means locating said mirror between said roof-edge prism and said image receiving surface, and a light cell including means securing said cell on the inner wall of said view-finder chamber opposite said eye-piece, said mirror being partially permeable to light reflecting a portion of the light impinging on it to said light cell for measuring of the intensity of illumination of said view-finder image and the other portion passing through same to said prism.

2. A mirror reflex camera having an optical view-finder system comprising a view-finder chamber, a roof-edge prism having a spherically curved hypotenuse surface, an image receiving surface, an eye-piece, a mirror correcting the upright view-finder image, means locating said mirror between said roof-edge prism and said image receiving surface, and a light cell including means securing said cell on the inner wall of said view-finder chamber opposite said eye-piece, said mirror being partially permeable to light reflecting a portion of the light impinging on it to said light cell for measuring of the intensity of illumination of said view-finder image and the other portion passing through it to said prism.

3. A mirror reflex camera having an optical view-finder system comprising a view-finder system, a roof-edge prism, a pivotable holder for said prism swinging said prism into said camera so that a surface of said prism lies substantially in the same plane with the upper edge of said camera leaving said view-finder sight unobstructed, an image receiving surface, an eye-piece, a mirror correcting the upright view-finder image, means locating said mirror between said roof-edge prism and said image receiving surface, and a light cell including means securing said cell on the inner wall of said view-finder chamber opposite said eye-piece, said mirror being partially permeable to light reflecting a portion of the light impinging on it to said light cell for measurement of the intensity of illumination of said view-finder image and the other portion passing through it to said prism.

4. A mirror reflex camera according to claim 3 and said pivotable holder for said roof-edge prism having downwardly extending side lugs one of said lugs having a part covering said view-finder sight opening when said holder is swung into said camera.

5. A mirror-reflex camera having an optical view-finder system comprising a view-finder chamber having a view field opening, a partially light-permeable mirror in said chamber, said mirror having a plane obliquely inclined to the direction of the entering light rays, one part of said rays passing straight through said mirror conducted to said view field opening, and a photo-electric cell in said view-finder chamber, the other part of said rays being sideways deflected to said photo-electric cell, said photo-electric cell being positioned out of the way of the straight passing beam of said rays in said view-finder chamber.

6. A mirror-reflex camera according to claim 5, and having a ground-glass panel arranged at the entrance of said rays in said view-finder chamber.

7. A mirror-reflex camera according to claim 5, and said partially light-permeable mirror being positioned essentially in a plane perpendicular to the plane of the reflex mirror of said mirror-reflex camera.

8. A mirror-reflex camera having an optical view-finder system comprising a view-finder chamber having a view-finder opening, said chamber having arranged therein, in sequence, a ground-glass panel, a partially light-permeable mirror obliquely positioned with respect to the direction of the rays arriving from said ground-glass panel, a penta-prism reflecting a part of said rays arriving from said ground-glass panel passing straight through said oblique mirror back to the latter and deflecting said part in a perpendicular direction to said view-finder opening, and a photo-electric cell located out of the way of said straight passing rays on the inner wall of said view-finder chamber opposite to said view field opening, said oblique mirror deflecting a part of said rays arriving from said ground-glass panel to said photo-electric cell for measuring the light intensity, the image simultaneously being observed in said view field opening.

References Cited in the file of this patent

UNITED STATES PATENTS

| | | |
|---|---|---|
| 2,297,428 | Nuchterlein | Sept. 29, 1942 |
| 2,754,735 | Meyer | July 17, 1956 |
| 2,784,654 | Meyer | Mar. 12, 1957 |
| 3,060,823 | Nelson | Oct. 30, 1962 |